April 5, 1966  H. E. ELLISON  3,244,121
APPARATUS FOR MANUFACTURING FROZEN CONFECTIONS
Filed Dec. 31, 1962  2 Sheets-Sheet 2
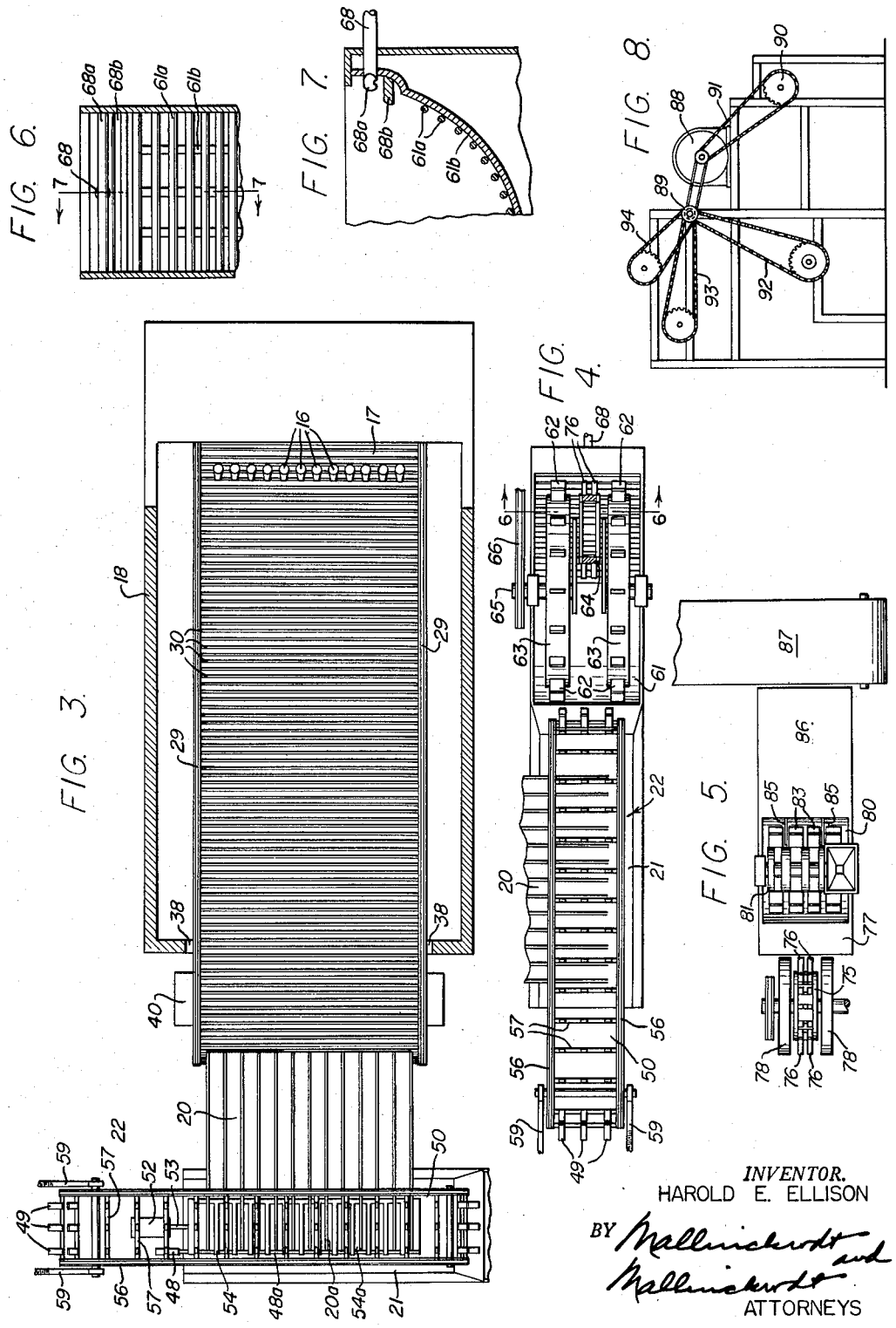
INVENTOR.
HAROLD E. ELLISON
BY
ATTORNEYS

United States Patent Office 3,244,121
Patented Apr. 5, 1966

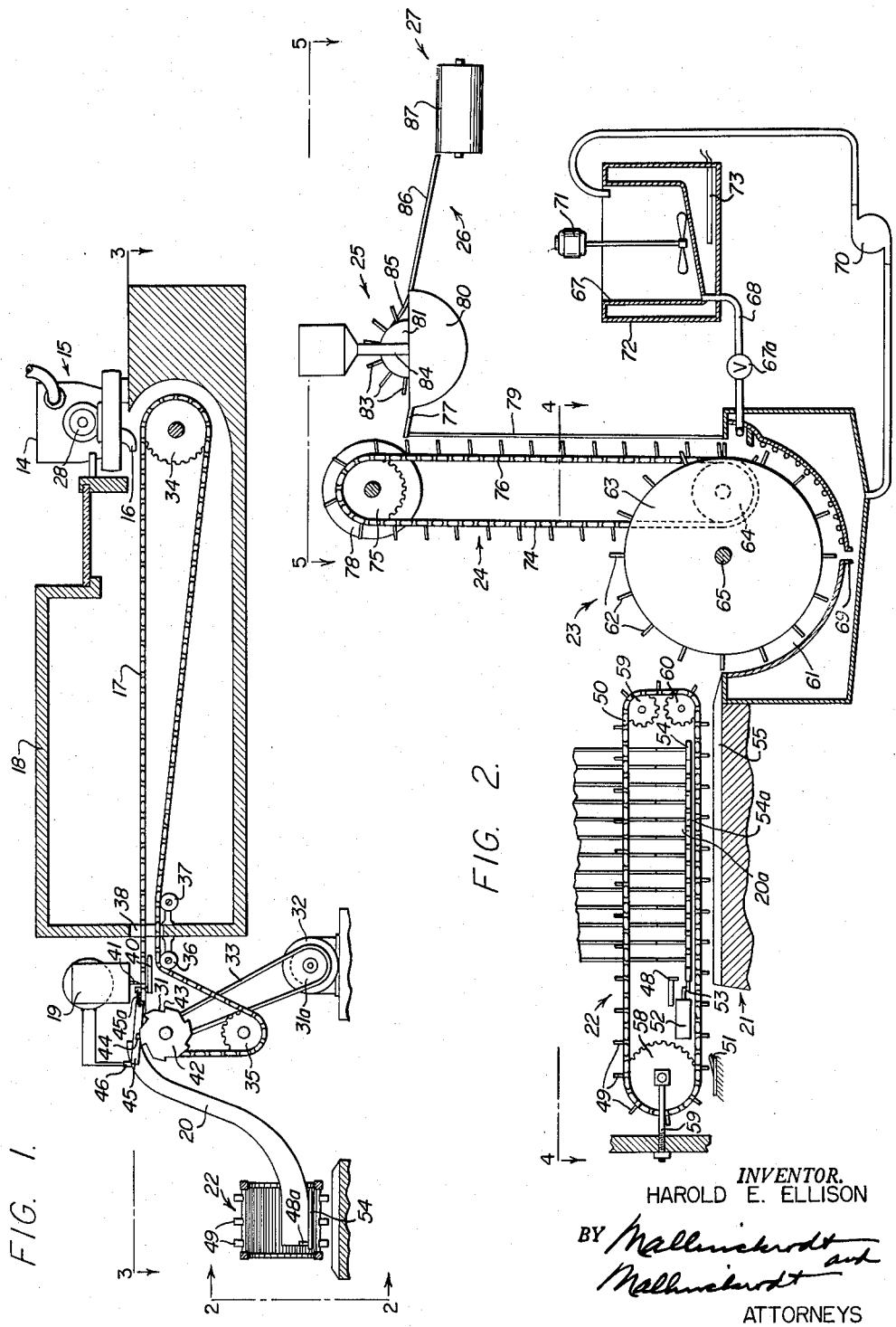

3,244,121
APPARATUS FOR MANUFACTURING FROZEN CONFECTIONS
Harold E. Ellison, Layton, Utah, assignor, by direct and mesne assignments, to Polar Missile Ice Cream of California, a corporation of California
Filed Dec. 31, 1962, Ser. No. 248,718
3 Claims. (Cl. 107—1)

This invention is concerned with developing a machine for shaping, freezing, cutting, and coating frozen confections and more particularly frozen ice cream bars.

In the past it has been customary to make such bars by freezing them to desired shape in molds, releasing them from the molds and dipping them in the coating or coatings desired. This has required a large labor force, a great deal of space in which to store, use, and clean the molds and considerably more production time than is desirable from the standpoint of economics. Additionally, in releasing the bars from molds it is necessary that the molds be warmed, with a resultant melting of the outer surface of the item. This has proved especially undesirable in the case of ice cream novelty bars since coating materials will not readily adhere to the melted surface. If the items are re-frozen the surfce will still remain sticky and will often leach through the coatings to present an unsightly appearance.

It is a primary object of this invention to provide a machine capable of rapidly, economically and continuously producing frozen confection bars that are of consistent size and shape, and that are uniformly coated with a base coating, as for example chocolate, and also preferably with a coarse coating material, such as nuts, crumbs, coconut, or the like, to present an overall appearance appealing to the consumer. Although the apparatus is disclosed, for purposes of illustration, as being used in the formation of frozen ice cream bars, it should be realized that the bars could also be made of sherbet or other ingredients.

Further objects include the provision of apparatus wherein the bars are cut to a predetermined length after they have been extruded into a desired size of preferably round cross-sectional configuration, and frozen, thereby resulting in bars that are of uniform size and shape, with a neatly trimmed appearance; a base coating material, such as chocolate, is cascaded over the bars as they are rotated to provide a complete and even coverage, excess coating being dripped back into the coating container and circulated for eventual use; and a coarse coating material such as crumbs, nuts, or the like are evenly distributed on the bars as they are rotated, without wasting such material.

Features of the invention in the achievement of the above objects include means for forming and extruding semi-frozen or "slush" ice cream or other confection as one or more continuous ribbons of preferably round cross-sectional configuration having a desired bite-size diameter, although any shape capable of rolling on an axis could be utilized; a freezing tunnel, through which the continuous ribbons are conveyed for freezing thereof; a cutter for neatly cutting the frozen ribbons into bars of desired length; a coating machine in which a base coating material is cascaded around the bars as they are rotated; a crumber in which crumbs, or the like, are evenly distributed over the coated bars as they are rotated; and means to convey the bars from the extruder, through the tunnel to the cutter, then to the coating machine, the crumber, and the usual packaging means.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

In the drawings:

FIG. 1 is a side elevation partly in section showing the extruder, freezing tunnel, cutter, and part of the conveyor means of the disclosed apparatus;

FIG. 2, an end elevation, partly in section taken on the line 2—2 of FIG. 1;

FIG. 3, a sectional plan view taken on the line 3—3 of FIG. 1;

FIG. 4, a similar view taken on the line 4—4 of FIG 2;

FIG. 5, another sectional plan view, taken on the line 5—5 of FIG. 2;

FIG. 6, a section taken on the line 6—6 of FIG. 4;

FIG. 7, a section taken on the line 7—7 of FIG. 6;

FIG. 8, a schematic showing of the synchronized drive arrangement utilized.

Referring to the drawings:

In the illustrated preferred construction semi-frozen or "slush" ice cream is placed in the hopper 14 of an extruder 15 which has a plurality of outlet nozzles 16 through which the ice cream is distributed as continuous ribbons of desired shape and size to a conveyor belt 17.

The conveyor belt carries the ribbons through tunnel 18, where they are frozen, and cutter 19, where they are cut to bars of desired length. The bars are then dumped down chute 20, released to slide 21, and dragged therealong by belt 22 to the coating machine 23. After being coated the bars are transported on elevator 24 to crumber 25. A coarse coating material such as crumbs, coconut, nuts, or the like, is evenly distributed thereon and the bars are released down discharge ramp 26 to conveyor 27, for movement to a packaging machine, not shown.

The entire operation is completely automatic and facilitates a rapid and continuous feed of the bars to the packaging machine.

Although the apparatus is illustrated as handling twelve ribbons of ice cream, it should be apparent that this number is merely exemplary and that any number of ribbons may be handled with but obvious modifications of the apparatus employed.

Because of the consistency of slush ice cream and its resultant tendencies to either clog nozzles 16 or to form voids at the nozzle inlets, it is necessary in order to keep the ice cream flowing, that the inlet to each nozzle be provided with a constant displacement pump, which may be of conventional type and hence is not shown. In order to insure a uniform product from all nozzles the pumps are all driven by motor 28 and will operate at the same speed. When confection other than ice cream is utilized this arrangement may or may not be necessary, depending on the characteristics of the material. For example, it may be that feed of some materials would be satisfactory without the pumps at the nozzles.

Endless conveyor belt 17 is constructed of a pair of chains 29 spaced apart by rods 30. The rods 30 are of sufficient length to allow the desired number of continuous ribbons of ice cream to be placed side by side thereon and spaced to prevent cut ice cream bars falling between the rods. The belt is driven through head sprockets 31 around which the chains pass, by motor 32 acting through chain 33 and sprocket 31a.

Tail sprockets 34 and guide sprockets 35 are provided for engagement with the chains to guide the belt in its continuous rotation and in dumping cut ice cream bars. Guide rollers 36 and 37 are provided to direct the belt through the opening 38 in the freezing tunnel.

Belt 17 passes beneath the nozzles 16 of extruder 15 and continuous ice cream ribbons are deposited thereon. These are carried through tunnel 18 where cold air is circulated around the ribbons and through the rods 30 to freeze the ribbons solid. As the solid ribbons pass through opening 38, cutter 19 cuts them to desired length, after which they fall from the belt into chute 20.

Cutter 19 comprises a cutting platform 40 and a cooperating punch press type blade 41 for each ribbon to be cut. These blades are operated in accordance with the speed of belt 17 to cut the ribbons at predetermined lengths. To achieve the desired synchronization, a cam wheel 42 is utilized. The cam wheel is fixed to the axis of sprockets 31 and rotates counter-clockwise therewith. As the raised surfaces 43 approach their uppermost position their abrupt faces contact abutment 44 of rod 45 and move it forward until switch 46 is actuated. This will engage the clutch of the punch press and cause the blades to move downwardly. As each raised surface revolves past its uppermost position the circular abutment 44 slips out of engagement therewith, and under the influence of spring 45a, rod 45 releases the switch and is returned to its original position, where it is positioned to be contacted by the abrupt face of the next raised surface.

After being cut the bars fall over the end of the belt into chute 20 which is divided to provide individual passages for each bar to slide in. These separated passages will hold the bars in their position relative to one another so that they will simultaneously contact pivot bar 48a adjacent the end of wall 47 and actuate switch 48. If one of the drag-pins 49, of endless drag belt 50 is contacting and closing switch 51 at the same time switch 48 is closed, a circuit is established to actuate solenoid 52. This will cause solenoid plunger 53 to be momentarily withdrawn and pull perforated plate 54, positioned under the lower end of chute 20, to align perforations 54a in the plate with openings 20a in the bottom of the chute. This allows only the bars then in contact with pivot bar 48a to fall from the chute, between the drag pins, and onto slide 55.

Drag belt 50 comprises a pair of chains 56 held apart by spacers 57, each having a plurality of drag pins 49 spaced thereacross. It should be apparent, however, that one solid projecting member extending across the spacers could as well be used. The chains pass counterclockwise around interconnected drive sprockets 58, the position of which may be varied by turning of bolts 59 to adjust the tension on the belt, and guide sprockets 59 and 60. Spacers 57 are located sufficiently far apart to allow the bars to fall therebetween to slide 55. As previously mentioned, the bars can drop through to the slide only when the switches 48 and 51 are both actuated, or therefore, when the bars are at the end of the chute and the spacers are properly aligned to allow a free fall.

As the belt passes around the sprockets the drag pins on the lower belt section extend to a position just above the slide, and push the bars therealong until they drop into the arcuately shaped trough 61, of the coating machine, shown generally at 23. The speed of belt 50 is such that each cut of bars is moved from beneath chute 20 before another cutting occurs.

Drive sprockets 58 are rotated by a motor acting through chains and a common jack shaft, as will be further explained.

As the bars fall into the coating machine they are caught by matching lugs 62 protruding from the edge of identical, spaced apart, wheels 63. Wheels 63 are positioned to rotate in the coating machine so that the ends of lugs 62 will be spaced slightly from the arcuate surface of trough 61, but not far enough to allow the bars to pass between the lugs and the arcuate surface. The lugs are spaced around the wheels so that each bar moved by the drag pins 49 will drop into trough 61 with one of a pair of lugs above, or behind, and the other below or in front of the bar. As the wheels are rotated, in a manner to be explained, the lugs above become pushers for the bar and eventually are rotated to a position beneath the bar to lift it.

As they are rotated by the lugs from a position near the bottom of trough 61 to the top of the trough, the bars, because of their generally circular cross-sectional configuration, will tend to revolve about their own axis. At the same time, a base coating, such as chocolate, is supplied to the trough at its top, from supply tank 67, through supply conduit 68 and slotted discharge nozzle 68a extending laterally across the trough. The slot in nozzle 68a allows an even distribution of base coating across the width of the trough which will fall onto a baffle 68b and from there onto the bars. It will then flow down the inner wall of the trough, cascading over ridges 61a formed transversely in the trough bottom between a plurality of parallel guides extending around the inner periphery of the trough, three of which are shown at 61b.

As the bars are rotated by the coating machine and revolve about their own axis, their surfaces will come in contact with the sprayed and cascading base coat and they will be continuously and evenly coated until the chocolate reaches the bottom of the trough. Small amounts of excess base coating applied will be dripped from the bars as they are elevated in a manner to be explained.

A drain port 69 is provided in the bottom of trough 61 through which excess base coating gravity flows into the interior housing of coating machine 23. From there it is circulated through pump 70 to be reheated in tank 67. An electrically operated stirring means 71 is provided in tank 67 and the material is warmed by transfer of heat from water in another tank 72 surrounding tank 67, the water being warmed by a thermostatically controlled heater 73. The amount of base coating supplied will be determined by the setting of manually operated control valve 67a in supply line 68, and this will be set to provide an amount slightly in excess of that actually required for adequate even coating of the bars.

Double sprocket 64 is provided between wheels 63 and has an axis eccentric of the wheels. The wheels and the double sprocket are conveniently mounted on a crankshaft 65, which may be rotated by movement of handle 66. This will change the position of the axis of the double sprocket, for a purpose to be explained. Undesired motion of handle 66 is prevented by friction, or if desired a positive latch means could be provided.

Elevator belt 24 has a pair of chains 74, which pass around double sprocket 64 and a similar double sprocket driving head 75. This belt also has spacer rods between the chains and a pair of lift pins 76 spaced across each spacer rod. The distance between spacer rods is designed such that each pair of lift pins will rotate in conjunction with a set of the lugs 62 on the wheels 63 so that the lugs will raise the bars to a position near the top of trough 61 and then they will be further elevated on the lift pins 76.

Since the double sprocket is mounted for rotation about the center section of crankshaft 64, whereas the wheels rotate about end sections, turning of handle 66 will rotate the center section and the double sprocket about the end sections. This will change the position of the axis of the double sprocket in an arc determined by the offset of the center portion of the crank, and allow the point at which the lift pins on the elevator belt picks up the bars carried by the pusher lugs 62 to be varied. Furthermore, with this arrangement the drive chains, spacer rods, and lift pins comprising the elevator belt are not dipped in the base coat material, as is the case with previously known coating machines. This greatly reduces malfunctioning of the elevator assembly and apparatus cleaning time.

When the bars reach a position slightly above an inclined plane 77 they are pushed from the lift pins by a pair of circular discs 78 fixed to the axle of the double sprockets 75. These discs have a radius greater than that of the sprockets and preferably as large as that from the center of the sprockets to the free ends of the lift pins passing therearound. Thus, as the elevator belt is raised and passed around sprockets 75 the discs rotating with the sprockets will contact the bars at both ends and push them from the pins onto the inclined ramp 77. The bars will roll or slide down the ramp into the crumber, shown generally at 25.

One or more wires 79 is fixed between the edge of trough 61 and the underside of inclined ramp 77 and extends parallel to the elevator belt in close enough proximity to the lift pins to prevent the bars rolling off as they are elevated.

Crumber 25 includes a trough 80 of semi-circular configuration, and a plurality of wheels 81, four being shown for purposes of illustration, mounted for rotation about an axis 82 located centrally of the flat open surface of the trough. The wheels 81 are of considerably less radius than the trough, and are spaced apart as shown best in FIG. 5. Interconnecting adjacent wheels and spaced therearound are paddles 83, which extend outwardly from the wheels such that when they are rotated they will just clear the inner arcuate surface of the trough. The paddles interconnecting any two wheels are positioned adjacent paddles interconnecting other wheels to form a broad support platform for the bars to lie across.

Positioned above the open side of trough 80 is a conventional type agitating hopper. As the apparatus is operated a control operator manually regulates the volume of coarse coating materials such as crumbs, nuts, or the like discharged from the hopper into the trough through conduit 84 in accordance with the amount used.

In operation of the crumber, as the wheels and paddles fixed thereto are rotated clockwise by a drive means to be further explained, the paddles will scoop up and carry crumbs or the like from the bottom of the trough. As each paddle approaches the inclined ramp 77 a bar will slide or roll thereon. Continued rotation of the wheels will cause the bar to revolve about its own axis and the crumbs, nuts or the like carried by the paddle to be evenly spilled over the bar where they will adhere to the still sticky base coat. Excess coarse coating material will fall between the spaced wheels and back to the trough.

The bars are removed from the crumber by use of a pair of strong resilient wires 85 fixed to a discharge slide 86 and extending through the two outermost openings between adjacent paddles into tangential contact with the wheels above the open side of the trough. As the bars are rotated on the paddles to the discharge side of the crumber, the ends of the wires are forced under the bars to allow them to roll down the wires and the discharge slide 86 to conveyor belt 87, which will transport them to a conventional packaging machine, not shown.

As previously explained, the conveyor belt through the freezing tunnel is driven by motor 32; the extruder is controlled by motor 28; a separate punch-press motor is provided for cutter 19, although regulation of the cutter is by a clutch operated in accordance with the length of travel of conveyor belt 17; and separate motors are provided to drive the stirring means 71, and base coat pump 70.

All of the other movable components are preferably driven by motor 88, which may be of variable speed construction, either through a direct drive, or through a jack shaft 89. Thus, the drag belt 50 is directly connected to the motor, through sprocket 90 fixed to the drive sprocket 58, and chain 91. The wheels of the coating machine and the crumber machine, and the head sprockets of the elevator are driven by chains 92, 93, and 94 respectively, interconnecting sprockets on the jack shaft and the axis of each rotary component.

The use of a central drive system greatly facilitates timing of the various elements to allow a continuous, and smooth flow of the bars throughout the entire operation, but other drive systems could be utilized. Belts and pulleys, or gears, could also be used as motion transmitting means, rather than the arrangement disclosed, without departing from the scope of the invention.

Whereas there is here illustrated and specifically described a certain preferred procedure and construction of apparatus which is presently regarded as the best mode of carrying out the invention, it should be understood that various changes may be made and other construction adopted without departing from the disclosed inventive concepts particularly pointed out and claimed herebelow.

I claim:

1. Apparatus for manufacturing frozen confectionary bars comprising extrusion means for extruding in desired cross-sectional configuration, continuous ribbons of a semi-frozen material to be coated; a conveyor upon which said ribbons are deposited; means to freeze solid said material while on said conveyor; a cutter positioned and arranged to cut said ribbons into bars of desirable length; a base coating machine including means to evenly coat said bars with base coat material; a crumber including means to spill a coarse coating material over said bars to adhere to said base coat material; means for transporting the bars from said conveyor to said base coating machine, said means for transporting the bars from said conveyor comprising a chute partitioned to maintain the bars simultaneously fed thereto from the conveyor separated, a gate at the bottom of said chute, electrical switch means closed in response to contact of bars with the end of the chute, a slide positioned below the chute and leading to said base coating machine, an endless drag belt positioned to pass between the slide and the chute, said drag belt comprising a pair of chains rotatable about and driven through sprockets, and said chains being interconnected by spacers having drag pins thereon; solenoid means for positioning said gate; an electrical switch closed by each of said spacers when they come in contact therewith, the switch means closed by the bars at the end of the chute being connected in series with the switch closed by the spacers such that only when both are closed is the solenoid means actuated, actuation of said solenoid means positioning the gate whereby bars fall from the chute through the gate and between the spacers and chains to the slide, to be moved by the drag pins to the base coating machine; means for transporting said bars from said base coating machine to said crumber, said last named means including an elevator having a pair of chains interconnected by spacer rods with spaced lift pins projecting therefrom, said spacer rods and said lift pins being spaced to coact with said base coating machine to raise the bars above the base coating machine; means for discharging the bars from the elevator to the crumber; and means for transporting said bars away from said crumber.

2. The apparatus of claim 1 wherein the means to discharge the bars from the elevators include circular disks fixed for rotation on the same axis as head sprockets about which the elevator chains pass, said disks having a diameter larger than the diameter of said head sprockets.

3. Apparatus for manufacturing frozen confectionary bars comprising extrusion means for distributing in desired cross-sectional configuration continuous ribbons of a semi-frozen material to be coated; a conveyor upon which said ribbons are deposited; means to freeze solid said material while on said conveyor; a cutter positioned and arranged to cut said ribbons into bars of desired length; a base coating machine including means to evenly coat said bars with a base coat material; a crumber including means to spill a coarse coating material over said bars to adhere to said base coat material; means for transporting said bars from said conveyor to said base coating machine, and from said coating machine to the crumber, including an elevator having a pair of chains interconnected by spacer rods with spaced lift pins projecting therefrom, said spaced rods and said lift pins being spaced to coact with said base coating machine to raise the bars above the base coating machine; and means for discharging bars from the elevator to the crumber, said means including circular disks fixed for rotation on the same axis as head sprockets about which the elevator chains pass, said disks having a diameter larger than the diameter of said head sprockets.

(References on following page)

References Cited by the Examiner

UNITED STATES PATENTS

| | | | |
|---|---|---|---|
| 797,276 | 8/1905 | Glauser | 107—1.4 |
| 813,375 | 2/1906 | Glauser | 107—69 |
| 1,010,174 | 11/1911 | Pooley | 107—4 |
| 1,848,250 | 3/1932 | Harnden | 107—4 |
| 2,115,969 | 5/1938 | Truesdale | 118—13 |
| 2,188,418 | 1/1940 | Routh | 107—69 |
| 2,348,800 | 5/1944 | Fredrickson | 118—13 |
| 2,380,806 | 7/1945 | Tunley | 118—13 |
| 2,424,949 | 7/1947 | White | 107—54.7 |
| 2,562,059 | 7/1951 | Otken | 118—13 |
| 2,642,821 | 6/1953 | Hettinger | 107—54.7 |
| 2,677,943 | 5/1954 | Nelson et al. | 107—4 X |
| 2,679,820 | 6/1954 | Petrilli | 118—30 |
| 2,782,754 | 2/1957 | Bookidis | 118—13 |
| 3,085,520 | 4/1963 | Fiedler | 107—8.05 |

FOREIGN PATENTS 497,211  10/1953  Canada.

CHARLES A. WILLMUTH, *Primary Examiner*.
WALTER A. SCHEEL, *Examiner*.